US011338648B2

(12) United States Patent
Renault (10) Patent No.: US 11,338,648 B2
(45) Date of Patent: May 24, 2022

(54) ENGINE FOR A TRANSPORT REFRIGERATION UNIT WITH AIR MANAGEMENT VALVE

(71) Applicant: CARRIER CORPORATION, Palm Beach Gardens, FL (US)

(72) Inventor: Loic Renault, Saint Etienne du Rouvray (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 48 days.

(21) Appl. No.: 16/920,067

(22) Filed: Jul. 2, 2020

(65) Prior Publication Data

US 2021/0001691 A1    Jan. 7, 2021

(30) Foreign Application Priority Data

Jul. 4, 2019 (EP) .................................... 19184507

(51) Int. Cl.
*B60H 1/32* (2006.01)
*F02D 9/02* (2006.01)
*F02B 29/04* (2006.01)

(52) U.S. Cl.
CPC ......... *B60H 1/3232* (2013.01); *B60H 1/3226* (2013.01); *F02D 9/02* (2013.01);
(Continued)

(58) Field of Classification Search
CPC ................ B60H 1/3226; B60H 1/3232; B60H 2001/3266; F02B 29/0481; F02B 29/0493;
(Continued)

(56) References Cited

U.S. PATENT DOCUMENTS 6,327,980 B1 * 12/2001 Chen ................... F02M 31/06
105/26.05
6,422,192 B1    7/2002 Bloomer
(Continued)

FOREIGN PATENT DOCUMENTS

EP    3438442 A1    2/2019
JP    10246161 A2    9/1998
WO    0047886 A1    8/2000

OTHER PUBLICATIONS

Extended European Search Report; Applicaion No. 19184507.2; dated Dec. 16, 2019; 8 pages.

*Primary Examiner* — Carl C Staubach
(74) *Attorney, Agent, or Firm* — Cantor Colburn LLP (57) ABSTRACT

Disclosed is a transport refrigeration unit (TRU) having: an engine configured to power a refrigeration system of the TRU, the engine including an air intake, the engine within an engine compartment of the TRU; an air management valve (AMV) fluidly coupled to the air intake; a first duct fluidly coupled to the AMV and including a first inlet within the engine compartment; and a second duct fluidly coupled to the AMV and including a second inlet that is exterior to the engine compartment and is configured to receive atmospheric air; wherein: the AMV is configured to modulate air into the engine from the first duct and the second duct, when a temperature of air within the AMV is above the first threshold and the temperature of air within the second duct is below the first threshold, to lower the temperature of air entering the engine to below the first threshold.

16 Claims, 6 Drawing Sheets

(52) U.S. Cl.
CPC .. *B60H 2001/3266* (2013.01); *F02B 29/0481* (2013.01); *F02D 2009/0201* (2013.01)

(58) Field of Classification Search
CPC ..... F02D 2009/0201; F02D 2200/0414; F02D 29/02; F02D 29/04; F02D 33/02; F02D 41/0002; F02D 9/02; F02M 31/042; F02M 31/07; F02M 31/20; F02M 35/10013; F02M 35/10255; F02M 35/10268
See application file for complete search history.

(56) References Cited

U.S. PATENT DOCUMENTS

| | | |
|---|---|---|
| 6,705,272 B2 | 3/2004 | Leipelt et al. |
| 7,287,503 B2 * | 10/2007 | Suzuki ................ F02M 35/024 123/184.53 |
| 8,137,425 B2 | 3/2012 | Saito et al. |
| 8,826,879 B2 | 9/2014 | Lee |
| 8,939,126 B2 | 1/2015 | Li et al. |
| 9,062,639 B1 | 6/2015 | Mackenzie et al. |
| 9,644,581 B2 | 5/2017 | Jung et al. |
| 10,221,819 B2 | 3/2019 | Jung et al. |
| 10,280,879 B2 | 5/2019 | Stempien et al. |
| 10,368,469 B1 * | 7/2019 | Shelnutt ............. H05K 7/20827 |
| 10,465,640 B1 * | 11/2019 | Wolgamott ........... F02D 41/182 |
| 10,563,900 B2 * | 2/2020 | Ferguson .............. F25D 21/125 |
| 10,682,897 B2 * | 6/2020 | Lucht ................... B60H 1/3222 |
| 11,072,321 B2 * | 7/2021 | Wenger ............. B60H 1/00771 |
| 2003/0029852 A1 | 2/2003 | Ozawa et al. |
| 2003/0230272 A1 | 12/2003 | Stuart |
| 2007/0197157 A1 * | 8/2007 | Bellinger ........... F02B 29/0493 454/155 |
| 2013/0220261 A1 | 8/2013 | Yun et al. |
| 2017/0009677 A1 * | 1/2017 | Brinkmann ...... F02M 35/10157 |
| 2018/0016967 A1 * | 1/2018 | Moore ............. F02M 35/10255 |

* cited by examiner

ENGINE FOR A TRANSPORT REFRIGERATION UNIT WITH AIR MANAGEMENT VALVE

FOREIGN PRIORITY

This application claims priority to European Application No. 19184507.2 filed Jul. 4, 2019, the entire contents of which is incorporated herein by reference.

BACKGROUND

The disclosure relates to an engine for a transport refrigeration unit (TRU) and more specifically to an engine for a TRU having input ducts connected by an air management valve (AMV).

Fruits, vegetables and other perishable items, including meat, poultry and fish, fresh or frozen, are commonly transported in the cargo box of a truck or trailer, or in an intermodal container. Accordingly, it is customary to provide a transportation refrigeration system in operative association with the cargo box for cooling the atmosphere within the cargo box. The transport refrigeration system includes a refrigerant vapor compression system, also referred to as a transport refrigeration unit (TRU), and an on-board power unit. The refrigerant vapor compression system typically includes a compressor, a condenser, an expansion device and an evaporator serially connected by refrigerant lines in a closed refrigerant circuit in accord with known refrigerant vapor compression cycles. The power unit includes an engine, typically diesel powered.

Air intake assemblies deliver intake air to an intake manifold of the diesel engine for powering a refrigeration unit in a trailer of a transport refrigeration unit (TRU). The air intake assembly may be arranged in an engine compartment for the TRU, which may be within the trailer. The air intake assembly may include an air cleaner enclosure unit and an air intake duct. Intake air may flow from the air cleaner enclosure unit, through the intake duct and into an intake manifold for the engine. In general, the engine compartment may become hot in temperature due to the operational temperatures of the various components housed in the engine compartment. As a result, the intake air may become undesirably warmed, resulting in a potential reduction in engine power and fuel economy occurs.

SUMMARY

Disclosed is a transport refrigeration unit (TRU) comprising: an engine configured to power a refrigeration system of the TRU, the engine including an air intake, the engine within an engine compartment of the TRU; an air management valve (AMV) fluidly coupled to the air intake; a first duct fluidly coupled to the AMV and including a first inlet within the engine compartment; and a second duct fluidly coupled to the AMV and including a second inlet that is exterior to the engine compartment and is configured to receive atmospheric air; wherein: the AMV is configured to modulate air into the engine from the first duct and the second duct, when a temperature of air within the AMV is above the first threshold and the temperature of air within the second duct is below the first threshold, to lower the temperature of air entering the engine to below the first threshold.

In addition to one or more of the above disclosed features, or as an alternate, the AMV is configured to be full closed when a temperature of air within the AMV and air within the second duct are both below a first threshold, whereby the first duct is fluidly connected to the engine and the second duct is fluidly sealed from the engine; and/or the AMV is full opened when the temperature of air within the AMV and air within the second duct are both above the first threshold, whereby the first duct is fluidly sealed from the engine and the second duct is fluidly connected to the engine.

In addition to one or more of the above disclosed features, or as an alternate, the AMV is configured so that at startup of the engine, the AMV is half open.

In addition to one or more of the above disclosed features, or as an alternate, the AMV configured so that, prior to modulating air into the engine, the AMV is fully closed until a temperature of air within the first duct is above a second threshold, the second threshold being greater than the first threshold.

In addition to one or more of the above disclosed features, or as an alternate, the AMV is configured to provide an alert when the temperature of air within the first duct is above a second threshold.

In addition to one or more of the above disclosed features, or as an alternate, the TRU comprises a plurality of temperature sensors operationally connected to the AMV, including a first sensor at the first duct, a second sensor at the second duct and a third sensor at the AMV, and the AMV configured to modulate air into the air intake responsive to temperatures sensed by the plurality of temperature sensors.

In addition to one or more of the above disclosed features, or as an alternate, the AMV is an electronic throttle valve.

In addition to one or more of the above disclosed features, or as an alternate, the TRU comprises a controller operationally connected to the engine, the AMV and the plurality of temperature sensors, the controller configured to control the AMV to modulate air into the air intake responsive to communications with the plurality of temperature sensors.

In addition to one or more of the above disclosed features, or as an alternate, the engine includes an air filter connected between the air intake and the AMV.

In addition to one or more of the above disclosed features, or as an alternate, the TRU further comprises a trailer that includes a first section that defines the engine compartment.

In addition to one or more of the above disclosed features, or as an alternate, the engine compartment is insulated with foam, thereby providing acoustic insulation.

In addition to one or more of the above disclosed features, or as an alternate, the trailer includes a second section, the second section including the refrigeration system.

In addition to one or more of the above disclosed features, or as an alternate, the engine is a diesel engine.

Further disclosed is a method of controlling air into an engine disposed in an engine compartment of a transport refrigeration unit (TRU), the engine configured to power a refrigeration unit of the TRU, the method comprising: activating the engine to activate an air management valve (AMV) connected to an air intake of the engine, wherein: a first duct is fluidly coupled to the AMV and a first inlet of the first duct is within the engine compartment; and a second duct fluidly coupled to the AMV, wherein a second inlet of the second duct is exterior to the engine compartment and is configured to receive atmospheric air; and when a temperature of air within the AMV is above the first threshold and the temperature of air within the second duct is below the first threshold, the method includes modulating air into the engine from the first duct and the second duct by the AMV to lower the temperature of air entering the engine to below the first threshold.

In addition to one or more of the above disclosed features, or as an alternate, the method further comprises: fully closing the AMV when a temperature of air within the AMV and air within the second duct are both below than a first threshold, thereby fluidly connecting the first duct to the engine and fluidly sealing the second duct from the engine; and/or fully opening the AMV when a temperature of air within the AMV and air within the second duct are both above the first threshold, thereby fluidly sealing the first duct from the engine and fluidly connecting the second duct to the engine.

In addition to one or more of the above disclosed features, or as an alternate, the method further comprises opening the AMV by half at startup of the engine.

In addition to one or more of the above disclosed features, or as an alternate, the method further comprises maintaining the AMV in a closed configuration until a temperature of air within the first duct is above a second threshold that is greater than the first threshold.

In addition to one or more of the above disclosed features, or as an alternate, the method further comprising providing an alert when the temperature of air within the first duct is above the second threshold.

In addition to one or more of the above disclosed features, or as an alternate, the method further comprises modulating air into the engine by the AMV responsive to temperatures sensed by a plurality of temperature sensors, wherein the plurality of temperature sensors include a first sensor at the first duct, a second sensor at the second duct and a third sensor at the AMV.

In addition to one or more of the above disclosed features, or as an alternate, the method further comprises controlling the AMV to modulate of air into the engine by a controller, operationally connected to engine, the AMV, and the plurality of temperature sensors, responsive to communications with the plurality of temperature sensors.

BRIEF DESCRIPTION OF THE FIGURES

The present disclosure is illustrated by way of example and not limited in the accompanying figures in which like reference numerals indicate similar elements.

DETAILED DESCRIPTION

Figure 1:
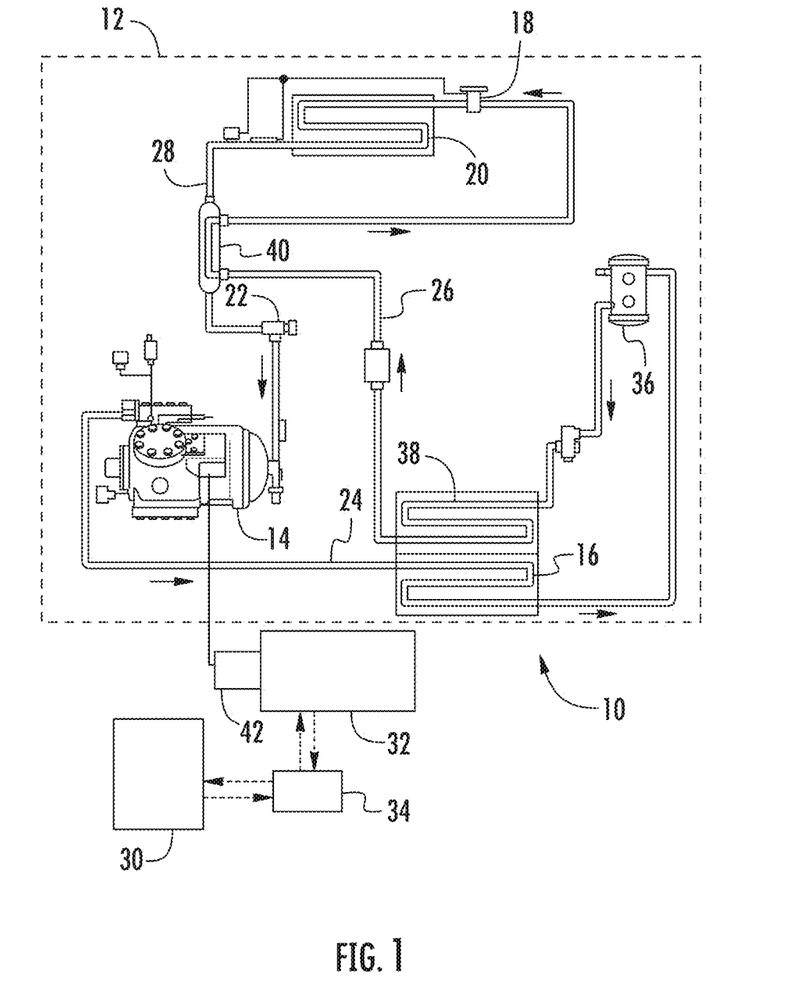
FIG. 1 shows a diesel engine connected to a generator to power compressor wherein one or more of the features of the disclosed embodiments may be utilized.
Figure 2:
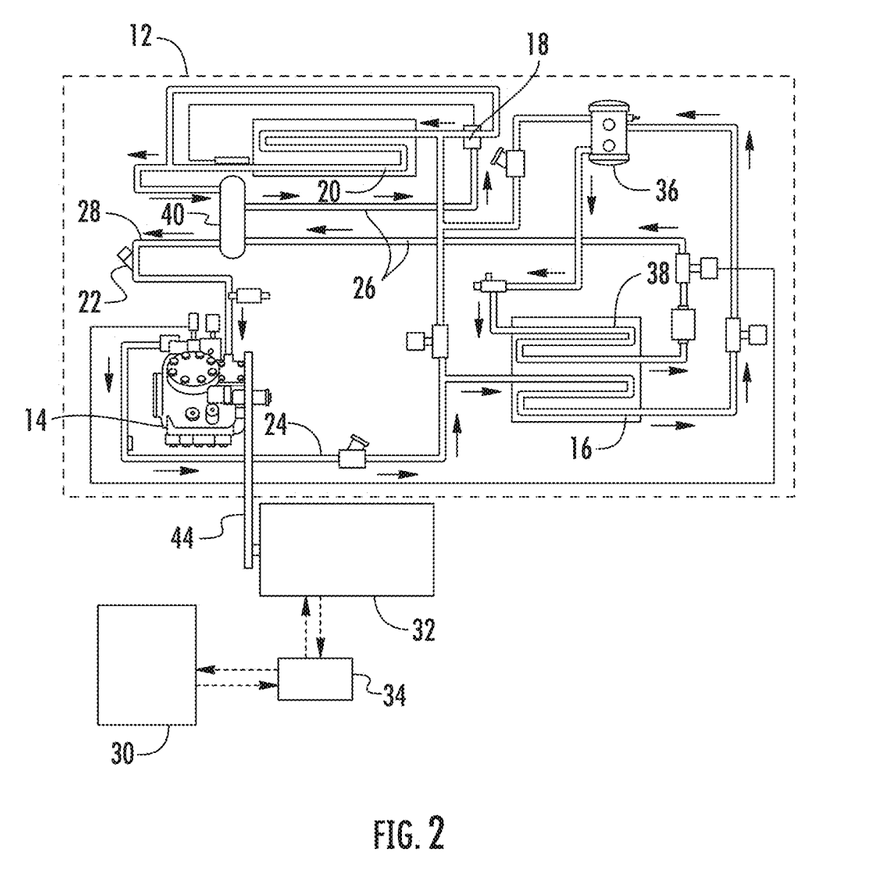
FIG. 2 shows another diesel engine connected to a generator to power wherein one or more of the features of the disclosed embodiments may be utilized.

Referring initially to FIGS. 1 and 2, there are depicted exemplary embodiments of transport refrigeration systems for controlling the temperature of the atmosphere within the cargo box of a truck, trailer, container, intermodal container or similar cargo transportation unit. The transport refrigeration system 10 includes a transport refrigeration unit 12 including a compressor 14, a (refrigerant) condenser heat exchanger 16, an expansion device 18, a (refrigerant) evaporator heat exchanger 20 and a suction modulation valve 22 connected in a closed loop refrigeration circuit including refrigerant lines respectively 24, 26 and 28 and arranged in a conventional refrigeration cycle. The transport refrigeration system 10 further includes an (electronic system) controller 30, a (diesel) engine 32 and an engine controller 34. The transport refrigeration system 10 is mounted as in conventional practice to an exterior wall of the truck, trailer or container with the compressor 14 and the condenser heat exchanger 16 with its associated condenser fan(s) (not shown) and engine 32 disposed externally of the refrigerated cargo box.

As is conventional practice, when the transport refrigeration unit 12 is operating in a cooling mode, low temperature, low pressure refrigerant vapor is compressed by the compressor 14 to a high pressure, high temperature refrigerant vapor and passed from the discharge outlet of the compressor 14 into refrigerant line 24. The refrigerant circulates through the refrigerant circuit via refrigerant line 24 to and through the heat exchange tube coil or tube bank of the condenser heat exchanger 16, wherein the refrigerant vapor condenses to a liquid, thence through the receiver 36, which provides storage for excess liquid refrigerant, and thence through the subcooler coil 38 of the condenser. The subcooled liquid refrigerant then passes through refrigerant line 24 through a first refrigerant pass of the refrigerant-to-refrigerant heat exchanger 40, and thence traverses the expansion device 18 before passing through the evaporator heat exchanger 20. In traversing the expansion device 18, which may be an electronic expansion valve (EXV) as depicted in FIG. 1 or a mechanical thermostatic expansion valve (TXV) as depicted in FIG. 2, the liquid refrigerant is expanded to a lower temperature and lower pressure prior to passing to the evaporator heat exchanger 20.

In flowing through the heat exchange tube coil or tube bank of the evaporator heat exchanger 20, the refrigerant evaporates, and is typically superheated, as it passes in heat exchange relationship return air drawn from the cargo box passing through the airside pass of the evaporator heat exchanger 20. The refrigerant vapor thence passes through the refrigerant line 26, the refrigerant vapor traverses a second refrigerant pass of the refrigerant-to-refrigerant heat exchanger 40 in heat exchange relationship with the liquid refrigerant passing through the first refrigerant pass thereof. Before entering the suction inlet of the compressor 14, the refrigerant vapor passes through the suction modulation valve 22 disposed in refrigerant line 26 downstream with respect to refrigerant flow of the refrigerant-to-refrigerant heat exchanger 40 and upstream with respect to refrigerant flow of the compressor 14. By selectively reducing the open flow area through the suction modulation valve 22, the controller 30 can selectively restrict the flow of refrigerant vapor supplied to the compressor 14, thereby reducing the capacity output of the transport refrigeration unit 12 and in turn reducing the power demand imposed on the engine 32.

Air drawn from within the cargo box by the evaporator fan(s) (not shown) associated with the evaporator heat exchanger 20, is passed over the external heat transfer surface of the heat exchange tube coil or tube bank of the evaporator heat exchanger 20 and circulated back into the interior space of the cargo box. The air drawn from the cargo box is referred to as "return air" and the air circulated back into the cargo box is referred to as "supply air". It is to be understood that the term "air" as used herein includes mixtures of air and other gases, such as for example, but not limited to nitrogen or carbon dioxide, sometimes introduced into a refrigerated cargo box for transport of perishable product such as produce.

Although the particular type of evaporator heat exchanger 20 used is not limiting of the disclosed embodiments, the evaporator heat exchanger 20 may, for example, comprise one or more heat exchange tube coils, as depicted in the drawing, or one or more tube banks formed of a plurality of tubes extending between respective inlet and outlet manifolds. The tubes may be round tubes or flat tubes and may be finned or un-finned.

The compressor 14 may comprise a single-stage or multiple-stage compressor such as, for example, a reciprocating compressor as depicted in the exemplary embodiments shown in FIGS. 1 and 2. However, the compressor 14 may be a scroll compressor or other type of compressor as the particular type of compressor used is not germane to or limiting of the disclosed embodiments. In the exemplary embodiment of FIG. 1, the compressor 14 comprises a reciprocating compressor having a compressing mechanism, an internal electric compressor motor and an interconnecting drive shaft that are all sealed within a common housing of the compressor 14. The engine 32 drives an electric generator 42 that generates electrical power for driving the compressor motor, which in turn drives the compression mechanism of the compressor 14. The drive shaft of the engine 32 drives the generator shaft. In the embodiment of FIG. 2, the compressor 14 is a reciprocating compressor having a compressing mechanism with a shaft driven directly by the drive shaft of the engine 32, either through a direct mechanical coupling or through a belt drive 44 as illustrated in FIG. 2.

Figure 3A:
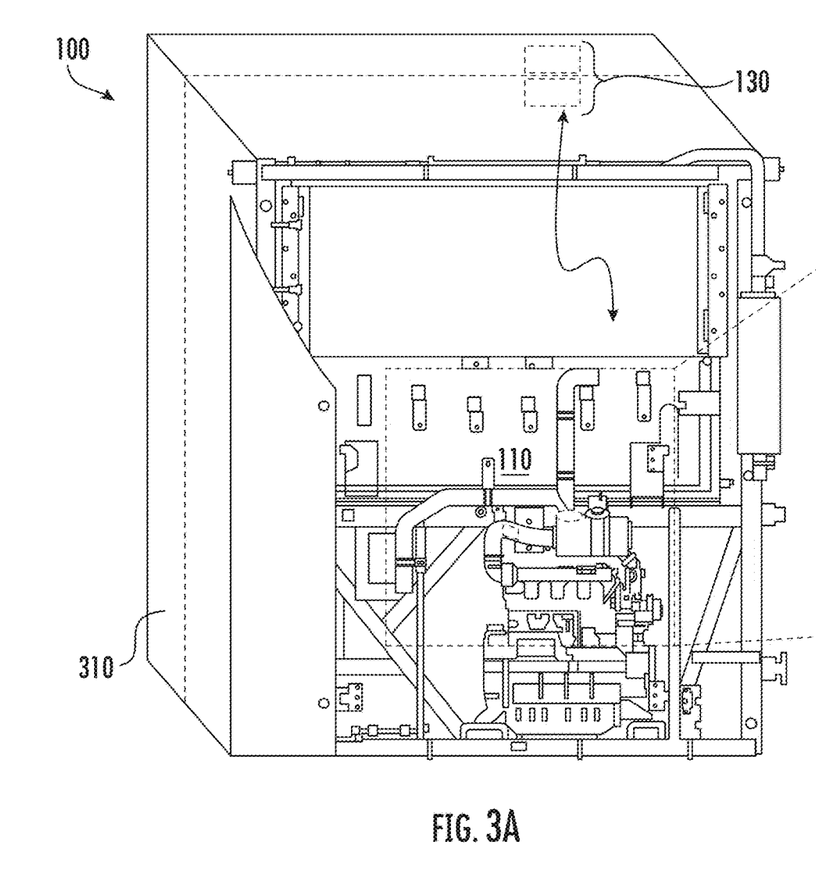
FIGS. 3a-3c illustrate features of an engine for a transport refrigeration unit (TRU) according to an embodiment.
Figure 3B:
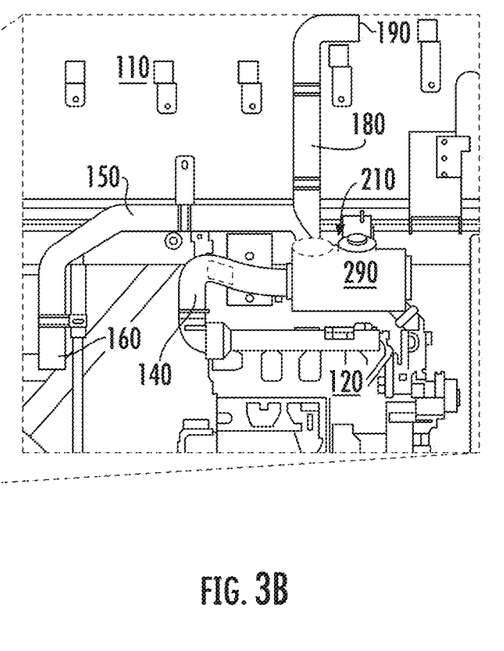
Figure 3C:
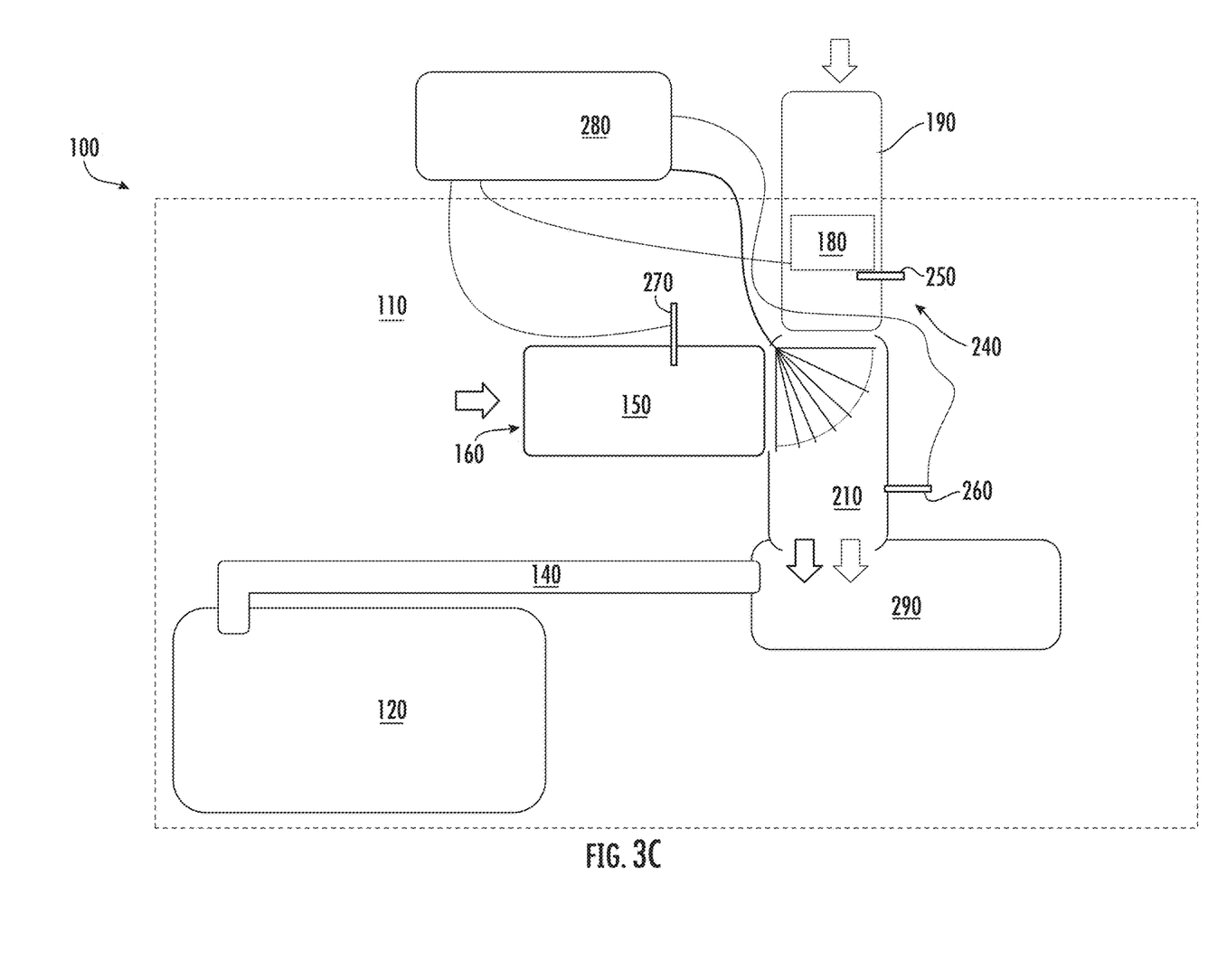
Figure 4:
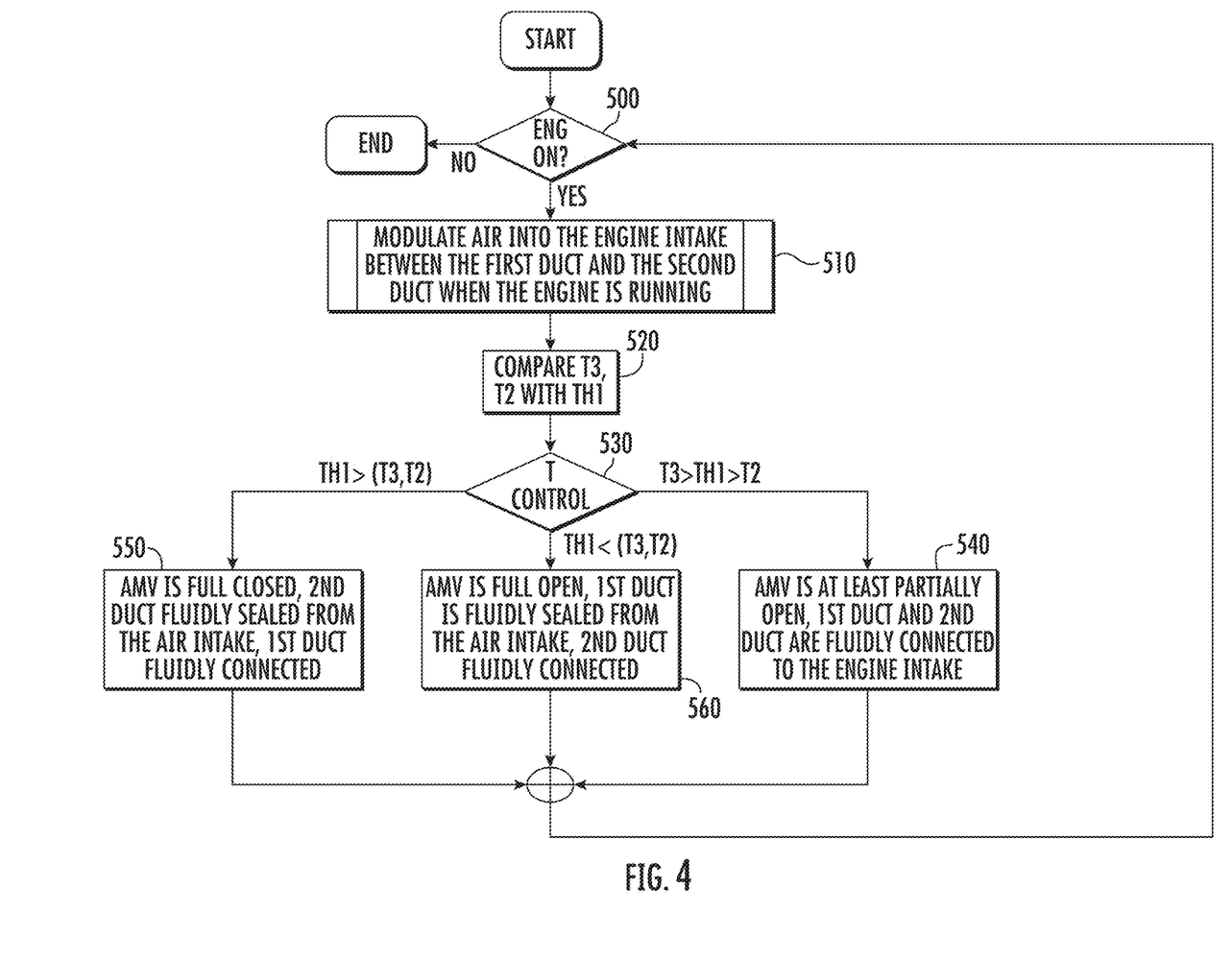
FIG. 4 illustrates a method of operating an engine illustrated in FIGS. 3a-3c according to an embodiment.
Figure 5:
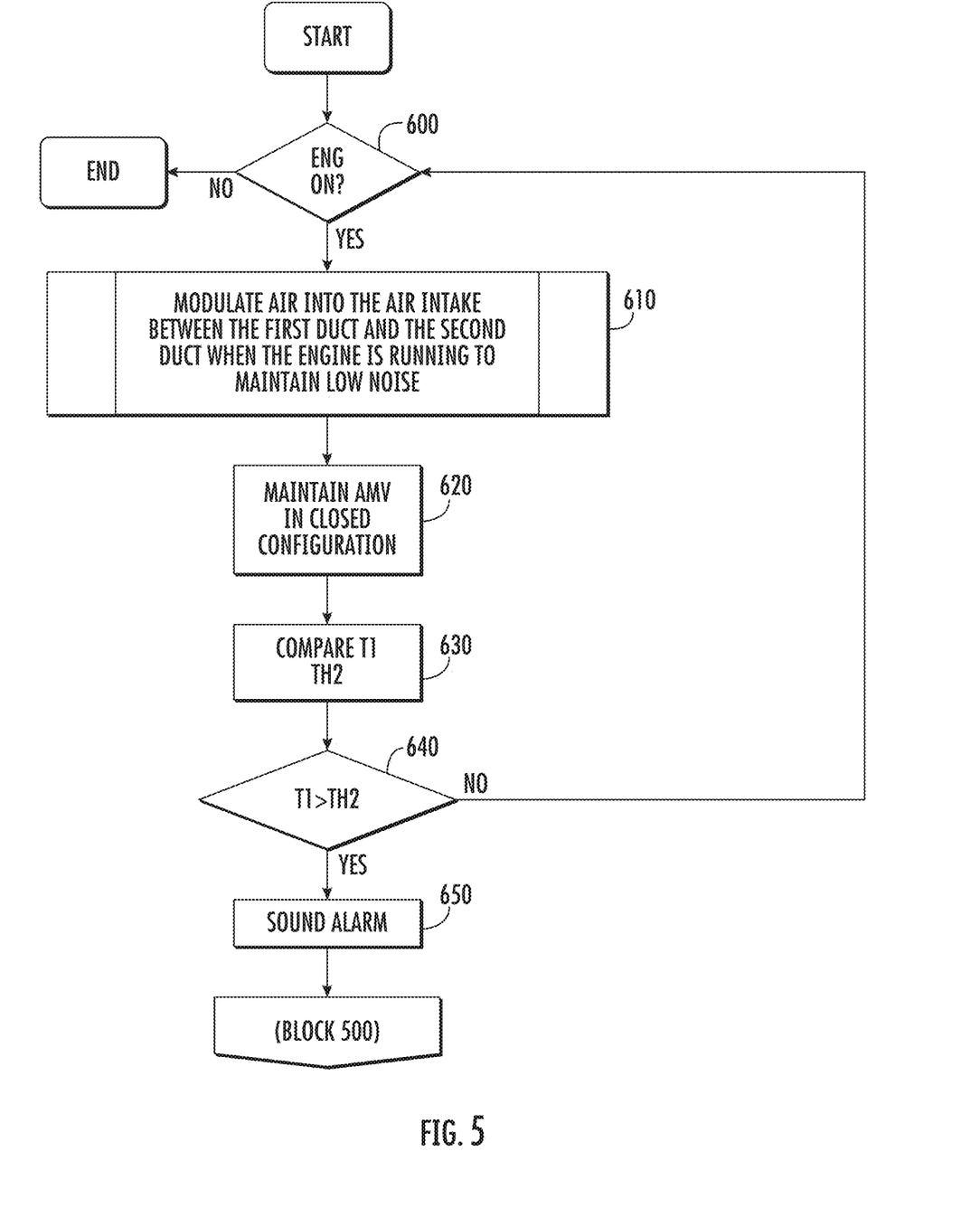
FIG. 5 illustrates a method of operating an engine illustrated in FIGS. 3a-3c according to an embodiment.

FIGS. 3-5 illustrate additional technical features associated with one or more disclosed embodiments. Unless indicated otherwise, features and elements disclosed in FIGS. 3-5 having nomenclature that is the same or similar to that in FIGS. 1 and 2 may be similarly construed even though numerical identifiers may differ.

Turning now to FIGS. 3a-3c, a transport refrigeration unit (TRU) 100 is illustrated. The TRU 100 includes an engine 120 configured to power a refrigeration system 130 (illustrated schematically and may include, without limitation, any components of the refrigerant vapor compression identified above) of the TRU 100. The engine 120 is disposed in an engine compartment 110 of the TRU 100. In one embodiment the engine 120 is a diesel engine. The engine 120 includes an air intake 140. An air management valve (AMV) 210 (illustrated schematically in FIGS. 3a and 3b) is fluidly connected to the air intake 140. A first duct 150 of the engine 120 is fluidly coupled to the AMV 210 and includes a first inlet 160 within the engine compartment 110. A second duct 180 of the engine 120 is fluidly coupled to the AMV 210 and includes a second inlet 190 that is exterior to the engine compartment 110 and is configured to receive atmospheric air.

The AMV 210 is configured to modulate air into the air intake 140 between the first duct 150 and the second duct 180 when the engine 120 is running. For example, if T1 is a temperature of air within the first duct, T2 is a temperature of air within the second duct, and T3 is temperature of air within the AMV 210, which represents a temperature of air entering the engine. In one embodiment, TH1 is a first temperature threshold, such as twenty five degrees Celsius, an inlet temperature below which the engine is designed to operate more efficiently (which may be different for different engines). In one embodiment, when a temperature of air within the AMV (T3) is above the first threshold (TH1), and a temperature of air within the second duct (T2) is less than the first threshold (TH1), that is, T3>TH1>T2, the AMV 210 is at least partially open to modulate air intake from inside and outside of the engine compartment in an effort to cool air (T3) entering the engine. A low T2 is indicative of low atmospheric conditions. A percentage in which the AMV 210 is opened or closed is dependent on the amount of ending cooling is needed.

In one embodiment, when a temperature of air within the AMV (T3) and air within the second duct (T2) are both below the first threshold (TH), that is, TH1>(T3, T2), the AMV 210 is fully closed. This configuration increases a mass of air coming from the engine compartment because the engine compartment will provide sufficiently cool air to the engine, as evidenced by the low T3. In the fully closed configuration the first duct 150 is fluidly connected to the air intake 140 and the second duct 180 is fluidly sealed from the air intake 140. In one embodiment, when the temperature of air within the AMV (T3) and air within the second duct (T2) are both above the first threshold (TH1), that is, TH1<(T3, T2), the AMV 210 is fully opened, to maximize air intake from the outside. This effort will cool the intake air with outside air, though the intake air will unlikely drop below TH1 due to the warm (high) atmospheric conditions. In this configuration, the first duct 150 is fluidly sealed from the air intake 140 and the second duct 180 is fluidly connected to the air intake 140.

In one embodiment, the AMV 210 is configured so that at startup of the engine, the AMV 210 is half open. The engine compartment may become heated from inactivity, for example, in a warm day, so that this configuration provides sufficiently cool air to the engine at startup.

The above disclosed embodiment identifies operation in a first mode directed to optimizing engine performance. In one embodiment, another mode of operation is provided in which low noise is a priority. Such mode may be utilized when, for example, the engine is operating at a relatively low speed (RPM or revolutions per minute) and with a relatively low engine load. In such embodiment, the AMV 210 is fully closed to maximize air coming from the engine compartment, which may be insulated for example by foam to reduce heat loss and minimize sound transference. In this embodiment the AMV 210 may be configured to provide an alert when the temperature of air within the first duct (T1) is above a second threshold (TH2), that is T1>TH2. The second threshold TH2 may be, for example, a temperature near which the engine 120 may overload, which would be greater than TH1 identified above. The operation then switches to the first mode to manage the AMV 210 so as to control the temperature of air into the engine 120.

In one embodiment, the AMV 210 comprises a plurality of temperature sensors generally referred to as 240 including a first sensor 250 at the first duct 150 that measures T1, a second sensor 260 at the second duct 180 that measures T2, and a third sensor 270 at the AMV 210 that measures T3. The AMV 210 is operationally connected to the plurality of temperature sensors 240 and the AMV 210 modulates air into the air intake 140 responsive to temperatures sensed by the plurality of temperature sensors 240. In one embodiment, the AMV 210 is an electronic throttle valve and the TRU 100 includes a controller 280 connected to the engine 120, the AMV 210 and the plurality of temperature sensors 240. The controller 280 may be configured to control the AMV 210 responsive to communications between the controller 280, the AMV 210 and the plurality of temperature sensors 240.

Other features of the TRU 100 may include an air filter 290 connected between the air intake 140 and the AMV 210. In one embodiment, the TRU 100 comprises a trailer 300 that includes a first section that defines the engine compartment 110. In one embodiment, the trailer 300 includes a second section 310 (illustrated schematically in FIG. 3*a*). The second section 310 may include various components of the refrigeration system 130, illustrated schematically.

Turning to FIG. 4, further disclosed is a method of controlling the AMV 210. As long as the engine is active (YES at block 500) the method advances to block 510 modulating air into the air intake between the first duct 150 and the second duct 180. Block 510 includes block 520 of comparing temperatures of air within the AMV (T3) and air within the second duct (T2) with the first threshold TH1. At block 530 a decision is made based on the comparison. When a temperature of air within the AMV (T3) is greater than the first threshold (TH1) and the temperature of air within the second ducts (T2) is less than the first threshold (TH1), that is, T3>TH1>T2 at block 530, the AMV 210 is configured at block 540 to open to provide a fluid connection between the first duct 150 and the second duct 180 to the engine 120 intake. The AMV 210 will modulate the opening so long as the engine is running (YES at 500), the temperature of air within the AMV (T3) is greater than the first threshold (TH1) and the temperature of air within the second duct (T2) is less than the first threshold (TH1). A percentage in which the AMV 210 is opened or closed is dependent on the amount of ending cooling is needed.

When a temperature of air within the AMV (T3) and air within the second duct (T2) and are both less than the first threshold (TH1), that is TH1>(T3, T2) at block 530, then at block 550 the AMV 210 is fully closed. This configuration fluidly connects the first duct 150 to the air intake 140, and fluidly sealing the second duct 180 from the air intake 140. When the temperature of air within the AMV (T2) and air within the second duct 180 (T2) are both above the first threshold (TH), that is TH1<(T3, T2) at block 530, then at block 560 the AMV 210 is fully opened. From this configuration, the first duct 150 is fluidly sealed from the air intake 140 and the second duct 180 is fluidly connected to the air intake 140. When the engine 120 is closed, the process ends (NO at block 500).

In a second mode of operation is illustrated in FIG. 5, which is a low-noise mode. In this mode, the AMV 210 is maintained in a fully closed condition to draw air from within the engine compartment 110 until the engine is close to an overheating condition defined by a second threshold, and then modulate air intake to provide engine cooling. Prolonged use of engine compartment air results in a avoiding the production of ambient noise for the same duration.

For example, the method comprises block 600 of activating the engine 120 (YES at block 600). Block 610 includes modulating air into the air intake 140 between the first duct 150 and the second duct 180 to maintain a low noise priority. Block 610 includes block 620 of maintaining the AMV 210 in the closed configuration so that the first duct 150 is fluidly connected to the engine 120 and the second duct 180 is fluidly sealed from the engine. Block 630 includes comparing a temperature of air within the first duct (T1) to the second threshold (TH2) to prevent engine overheating. At block 640 a decision is made based on the comparison. While the temperature of air within the first duct (T1) is less than the second threshold (TH2) (No at block 640), block 600 is executed. When temperature of air within the first duct (T1) is greater than the second threshold (TH2) (YES at block 640) an alarm is sounded at block 650 and then block 500 is executed to maintain cooling of the engine 120.

The disclosed embodiments provide a flexible and optimized design following real time needs, and avoids engine overheating in case of high ambient conditions. In addition, the embodiments provide a very low ambient conditions, air inlet from the engine compartment is helpful to make engine warm-up faster. The embodiments enable keeping peek engine requirements when necessary, and provides noise mitigation.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments.

Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A transport refrigeration unit (TRU) comprising:
   an engine configured to power a refrigeration system of the TRU, the engine including an air intake, the engine within an engine compartment of the TRU;
   an air management valve (AMV) fluidly coupled to the air intake;
   a first duct fluidly coupled to the AMV and including a first inlet within the engine compartment; and
   a second duct fluidly coupled to the AMV and including a second inlet that is exterior to the engine compartment and is configured to receive atmospheric air;
   wherein:

the AMV is configured to operate in an engine cooling mode, wherein the AMV is configured to modulate air into the engine from the first duct and the second duct, when a temperature of air within the AMV is above a first threshold and the temperature of air within the second duct is below the first threshold, to lower the temperature of air entering the engine to below the first threshold; and the AMV is configured to operate in a low noise priority mode, wherein:

prior to modulating air into the engine, the AMV is fully closed until the temperature of air within the first duct is above a second threshold, the second threshold being greater than the first threshold, the second threshold being nearer an engine overload temperature than the first threshold;

the AMV is configured to provide an alert when the temperature of air within the first duct is above the second threshold; and upon reaching the second threshold, the AMV operates in the engine cooling mode.

2. The TRU of claim 1 wherein:

the AMV is configured to be full closed when the temperature of air within the AMV and air within the second duct are both below the first threshold, whereby the first duct is fluidly connected to the engine and the second duct is fluidly sealed from the engine; and/or the AMV is full opened when the temperature of air within the AMV and air within the second duct are both above the first threshold, whereby the first duct is fluidly sealed from the engine and the second duct is fluidly connected to the engine.

3. The TRU of claim 2, wherein the AMV is configured so that at startup of the engine, the AMV is half open.

4. The TRU of claim 2, comprising a plurality of temperature sensors operationally connected to the AMV, including a first sensor at the first duct, a second sensor at the second duct and a third sensor at the AMV, and the AMV configured to modulate air into the air intake responsive to temperatures sensed by the plurality of temperature sensors.

5. The TRU of claim 4, wherein the AMV is an electronic throttle valve.

6. The TRU of claim 5, comprising a controller operationally connected to the engine, the AMV and the plurality of temperature sensors, the controller configured to control the AMV to modulate air into the air intake responsive to communications with the plurality of temperature sensors.

7. The TRU of claim 1, wherein the engine includes an air filter connected between the air intake and the AMV.

8. The TRU of claim 1, comprising a trailer that includes a first section that defines the engine compartment.

9. The TRU of claim 8, wherein the engine compartment is insulated with foam, thereby providing acoustic insulation.

10. The TRU of claim 9, wherein the trailer includes a second section, the second section including the refrigeration system.

11. The TRU of claim 1 wherein the engine is a diesel engine.

12. A method of controlling air into an engine disposed in an engine compartment of a transport refrigeration unit (TRU), the engine configured to power a refrigeration unit of the TRU, the method comprising:

activating the engine to activate an air management valve (AMV) connected to an air intake of the engine, wherein:

a first duct is fluidly coupled to the AMV and a first inlet of the first duct is within the engine compartment; and a second duct fluidly coupled to the AMV, wherein a second inlet of the second duct is exterior to the engine compartment and is configured to receive atmospheric air; and wherein the AMV is configured to operate in an engine cooling mode, so that when a temperature of air within the AMV is above a first threshold and the temperature of air within the second duct is below the first threshold, the method includes modulating air into the engine from the first duct and the second duct by the AMV to lower the temperature of air entering the engine to below the first threshold; and wherein the AMV is configured to operate in a low noise priority mode, so that:

prior to modulating air into the engine, the AMV is fully closed until the temperature of air within the first duct is above a second threshold, the second threshold being greater than the first threshold, the second threshold being nearer an engine overload temperature than the first threshold;

the AMV is configured to provide an alert when the temperature of air within the first duct is above the second threshold; and upon reaching the second threshold, the AMV operates in the engine cooling mode.

13. The method of claim 12, further comprising:

fully closing the AMV when the temperature of air within the AMV and air within the second duct are both below than the first threshold, thereby fluidly connecting the first duct to the engine and fluidly sealing the second duct from the engine; and/or fully opening the AMV when a temperature of air within the AMV and air within the second duct are both above the first threshold, thereby fluidly sealing the first duct from the engine and fluidly connecting the second duct to the engine.

14. The method of claim 13, further comprising opening the AMV by half at startup of the engine.

15. The method of claim 14, comprising modulating air into the engine by the AMV responsive to temperatures sensed by a plurality of temperature sensors, wherein the plurality of temperature sensors include a first sensor at the first duct, a second sensor at the second duct and a third sensor at the AMV.

16. The method of claim 15, comprising:

controlling the AMV to modulate of air into the engine by a controller, operationally connected to engine, the AMV, and the plurality of temperature sensors, responsive to communications with the plurality of temperature sensors.

* * * * *